United States Patent [19]

Goldfine et al.

[11] Patent Number: 5,343,529
[45] Date of Patent: Aug. 30, 1994

[54] TRANSACTION AUTHENTICATION USING A CENTRALLY GENERATED TRANSACTION IDENTIFIER

[76] Inventors: Milton Goldfine, 201 Ootsima Way, Loudon, Tenn. 37774; Marvin Perlman, 11000 Dempsey Ave., Granada Hills, Calif. 91344; Robert A. Montgomery, 306 Chuniloti Cir., Loudon, Tenn. 37774-2607

[21] Appl. No.: 127,893

[22] Filed: Sep. 28, 1993

[51] Int. Cl.5 ............................................. H04L 9/00
[52] U.S. Cl. ........................................ 380/23; 380/24; 380/25; 380/30; 380/49; 340/825.31; 340/825.34
[58] Field of Search ................................... 380/23–25, 380/4, 30, 49, 50; 235/379, 380; 340/825.31, 825.34

[56] References Cited

U.S. PATENT DOCUMENTS

| | | | |
|---|---|---|---|
| 4,376,279 | 3/1993 | Perlman et al. | 235/380 |
| 4,672,572 | 6/1987 | Alsberg | 380/23 |
| 4,691,355 | 9/1987 | Wirstrom et al. | 380/23 |
| 4,694,492 | 9/1987 | Wirstrom et al. | 380/23 |
| 4,720,860 | 1/1988 | Weiss | 380/23 |
| 4,723,284 | 2/1988 | Munck et al. | 380/25 |
| 4,885,778 | 12/1989 | Weiss | 380/23 X |

Primary Examiner—Bernarr E. Gregory
Attorney, Agent, or Firm—Allen N. Friedman

[57] ABSTRACT

Each access attempt transmitted to an authentication agency causes the agency to produce a request identifier unique to that request. The request identifier is transmitted back to the authentication code generator of the user initiating the access attempt, and to an authentication code generator in the agency. The agency also retrieves a user identifier from a database and sends it to its authentication code generator. Both the user's authentication code generator and the agency's authentication code generator independently combine, through identical or complementary transformations, the user identifier and the request identifier to form a user authentication code and an agency authentication code. The two authentication codes are presented by a comparator, which issues a permit signal only if the comparison indicates a match between the two authentication codes. The permit signal is transmitted to a transaction control device to permit the transaction to proceed. Since the authentication code is unique to each transaction attempt, interception of an authentication code will not permit an unauthorized user to successfully initiate another transaction. As an additional security feature, the user of irreversible transformations in the authentication code generator would prevent decoding of an intercepted authentication code and would not allow an unauthorized user to derive the user identifier associated with the transaction. As required by a particular application, additional levels of security can be achieved by using encryption steps in combination with the irreversible transformations at selected points in the process.

37 Claims, 6 Drawing Sheets

TRANSACTION AUTHENTICATION USING A CENTRALLY GENERATED TRANSACTION IDENTIFIER

BACKGROUND OF THE INVENTION

1. Field of Invention

This invention authenticates a transaction request in order to permit progress of a transaction based on a match between an authentication code generated by the requestor of the transaction and an authentication code generated by an authentication agency.

2. Brief Description of the Prior Art

Central authentication of remote transactions is an important mode of business conduct. Remote access to electronic funds transfer networks must be authenticated to prevent theft of funds. Access to communications systems, such as cellular mobile radio systems, must be authenticated to prevent theft of communication services. Authentication is also important in governing electronic access to computer networks and interactive television and physical access to secured locations. Operators of these kinds of systems have developed a number of different techniques for reducing the susceptibility of their systems to various forms of fraud. However, almost all of these techniques can be circumvented by sophisticated misusers with enough computer resources at their disposal or by dishonest employees who can access the systems at various exposed points to steal access code information.

Many of the authentication techniques use combinations of passwords and personal identification numbers (PINs) to attempt to verify that the user attempting to access a network or service is authorized for access. Unauthorized access using PINs and passwords improperly obtained can be somewhat reduced by requiring users to periodically change these codes. A personal identification system disclosed in U.S. Pat. No. 4,376,279 uses a PIN secretly selected by the user, a code number secretly selected by officers of the authenticating agency and an irreversible transform secretly selected by the manufacturer of the system to produce a code number that is magnetically encoded onto a user card, such as a credit card or banking access card. Since only the user knows the selected PIN, the user's entry of that PIN, after inserting the card into the system presumably establishes that authority of that user to access the system. However, even though the system is partitioned to protect different portions of the access code information, changing access codes is cumbersome, so that the same information is used over and over again. An eavesdropper or other person that can obtain access to the transaction data and with enough computer power may, over time, accumulate enough information to learn the access code and gain unauthorized entry.

Theft of telecommunication services through eavesdropping on cellular mobile radio calls has become a major problem. The eavesdropper captures or derives the caller's access code, builds it into his radio unit, and makes subsequent unauthorized calls billed to the original caller. A long period of time could go by before this misuse is discovered and the access code changed. Hackers seeking access to telecommunication and computer networks program their computers to try thousands of access codes in an attempt to find one that works. Once a successful code is found, the hacker can gain network access. Similar problems will exist for emerging interactive television services, such as entertainment and home shopping. Authentication techniques that use repeatedly transmitted access codes are susceptible to various sophisticated attacks. Some technique is needed to keep the attackers off balance.

SUMMARY OF THE INVENTION

The transaction authentication method that is the subject of the present invention uses a centrally generated identifier that is specific to each transaction request to assure that the access information being transmitted from point to point in the system is different for each transaction attempt. In this transaction authorization process and apparatus, each access attempt transmitted to an authentication agency causes the agency to produce a request identifier unique to that request. The request identifier is transmitted back to the authentication code generator of the user initiating the access attempt, and to an authentication code generator in the agency. The agency also retrieves a user identifier from a database and sends it to its authentication code generator. Both the user's authentication code generator and the agency's authentication code generator independently combine, through identical or complementary transformations, the user identifier and the request identifier to form a user authentication code and an agency authentication code. The two authentication codes are presented to a comparator, which issues a permit signal only if the comparison indicates a match between the two authentication codes. The permit signal is transmitted to a transaction control device to permit the transaction to proceed. Since the authentication code is unique to each transaction attempt, interception of an authentication code will not permit an unauthorized user to successfully initiate another transaction. As an additional security feature, the use of an irreversible transformation in the authentication code generator would prevent decoding of an intercepted authentication code and would not allow an unauthorized user to derive the user identifier associated with the transaction. As required by the particular application, additional levels of security can be achieved by using encryption steps (reversible) in combination with the irreversible transformations at selected points in the process.

This invention produces a flexible transaction authentication architecture that can be used to meet the security needs of a diversity of transactions, such as authorizing a call to a remote access port of a telecommunication network or a cellular mobile radio call to access the network, allowing remote access to a computer network, identifying a user as an authorized electronic funds transfer agent or legitimate user of interactive television services, and permitting physical access to a secured location. Each of these transactions has different points of vulnerability to eavesdropping from the outside or compromise by dishonest insiders. The inventive architecture permits use of transformation and/or encryption of the authentication information at different points in the system dependent on an analysis of the particular application's vulnerabilities. In any event, the authentication information will be different for each transaction attempt, greatly impeding or entirely foiling efforts to successfully complete an unauthorized transaction.

With modern integrated circuit technology, the transformation involved can be economically realized in a microprocessor or special purpose VLSI chip. This architecture gives the authorized user an economic advantage over the intended intruder. Since the authentication code changes in a virtually unpredictable way, an eavesdropper or intruder, collecting large amounts of data and applying much computer power, would find it practically impossible to determine a usable authentication code. However, the subject system compares authentication codes in their transformed or encrypted state without requiring inversion or decryption, which greatly simplifies the required equipment. The organization and operation of the invention can be better understood from consideration of the following detailed description of illustrative embodiments when read together with the accompanying drawings.

DETAILED DESCRIPTION OF THE INVENTION

The following detailed description and several exemplary embodiments will help convey an understanding of the claimed invention. The invention is a method and apparatus embodying a system architecture that enables a central authentication agency to govern attempts by a user to initiate a transaction. The kinds of transactions to which the invention is applicable include electronic access to communication systems, financial systems, computer networks, and interactive television and entertainment systems and physical access to secure locations. A fundamental principal of the invention is the central generation of an identifier that is unique to each transaction attempt. The identifier could, for example, be the time and date of the attempt, it could be a random number that is generated in the authentication agency each time a transaction is attempted or some other identifier number or code that is apparently not repeated or is not periodic within the time span of the transactions being attempted.

In the inventive architecture, authentication signals pass through two branches, a user branch and an authentication agency branch. The authentication signals passing through the two branches are then compared and a permit signal generated if the comparison is successful. The permit signal is then passed to the appropriate application device to allow the transaction to proceed. The application device may be, for example, a switch in a telecommunications system, a network access point into a computer or interactive television network, or a lock into a secured area.

The user attempting to initiate a transaction operates an access module which may, for example, be contained in a cellular telephone, a computer, an ATM access point, or within a lock securing a physical entry point. The access module must provide a means for user identification. For example, the user identification may be entered through an encoded card or key, or through a keyboard or keypad. For a cellular telephone, a user could insert a magnetically encoded card or other form of enabling key that contains a personal identification number (PIN). For an ATM or computer, a keyboard or key pad could be used to enter the user's personal identification information.

The architecture also includes transformation or encryption of the access information at various points in the two branches. The particular application is analyzed for its vulnerability to various forms of eavesdropping or interception by outsiders or various forms of interception by dishonest employees. This analysis will dictate the placement of various forms of transformation or encryption in the system. The transformations can be reversible or irreversible. The placement of the transformations or encryption steps can be either symmetric or asymmetric so long as the total transformation in the user branch is the same as the total transformation in the authentication agency branch by the time the signals are compared.

One important area of application of the invention is the field of telecommunications. In particular, the field of wireless communications such as cellular mobile radio. In this application, the following sequence of events could take place. The user enables the calling telephone by use of a telephone enabling key that contains the PIN identified with the user or with the telephone set itself. The user then lifts or otherwise activates the calling telephone handset to make the call. The calling telephone number is automatically sent to the central office which is the authentication agency. The central office generates a transaction identifier unique to that call attempt. The transaction identifier could be the date and time of the call attempt. The transaction identifier is then transmitted back to the user. An authentication code generator within the telephone combines the transaction identifier and the user's PIN to generate an authentication code. The authentication code is then transmitted back to the central office for comparison.

Within the central office, the telephone number of the calling telephone is routed to a database which looks up the associated user's PIN. The PIN and the transaction identifier are passed to an authentication code generator within the central office to generate an authentication code for comparison with the authentication code generated in the user's telephone. The comparison is made and, if successful, a permit signal is passed into the switching system to permit the call to proceed.

In a wireless communication system such as this, the transmission of the authentication code from the calling telephone to the central office is a point of particular vulnerability. In prior arts systems eavesdroppers, intercepting the authentication code, could build this code into their own telephone set and subsequently make unauthorized calls to be billed to the original user. However, in the system of the invention, since the authentication code is different for each call attempt, this is not possible. A more sophisticated unauthorized user may intercept both the transaction identifier and the authentication code and attempt to derive the PIN number. To protect against such an unauthorized user, the call identifier (e.g., calling telephone number) and PIN can be combined by means of an irreversible transform.

Analysis of the vulnerabilities of a particular system could suggest the use of additional transformations or encryption steps at different points in the system. For example, in the telephone set the PIN and calling telephone number could be combined in an initial transformation step which could be an irreversible transform. The irreversible transform of the calling telephone number and PIN or an encryption thereof would be stored within the central office's user identifier source (database) so that even within the central office the PIN is not available. The transform of the calling telephone number and PIN could be transmitted in the clear or encrypted between network elements. In this realization of the invention, the PIN is never stored or transmitted by any of the system's elements. As another security measure, the authentication codes could be encrypted or transformed with PIN (or an encrypted PIN), in both branches before the two signals are compared.

In all of the above variations, the comparison of two authentication signals will be successful if the successive application of the various transformations in the user branch produces the same total transformation as the successive application of the transformations on the central office side. However, irreversible transforms and all transforms or encryptions preceding them must be identical in both branches.

In all of these variations the authorized user has an advantage over the unauthorized user seeking to determine a usable PIN because the system architecture of the invention never requires application or derivation of an inverse transformation or the decryption of the signals. All signals are compared in a transformed or encrypted state. This places the unauthorized user in a very disadvantageous position and further protects the user's PIN number from being determined. All of the required transformation and encryption steps within the telephone set can be accomplished within a single microprocessor chip.

Another important application of the invention is in connection with access to automatic teller machines. In such machines the user inserts a magnetically encoded card and then manually enters a PIN number. This type of system is susceptible to interception of the PIN number as it is transmitted to the banking institution's central computer. Application of the invention would prevent an intercepted PIN number from being used subsequently to make unauthorized transactions, since the authorization code is different for each transaction. The use of an irreversible transform within the ATM access module would prevent a more sophisticated intruder from analyzing the transmitted signal to determine the user's PIN even if the intruder knew both the request identifier and the transform involved. Other financial transactions that could be similarly protected are money wire transfers and the presentation of personal credit cards.

In addition to controlling electronic access to various financial systems, the invented method and apparatus could be used to protect physical access to a secured location. In this case the permit signal, instead of controlling electrical access to a system, would control a physical lock.

Figure 1:
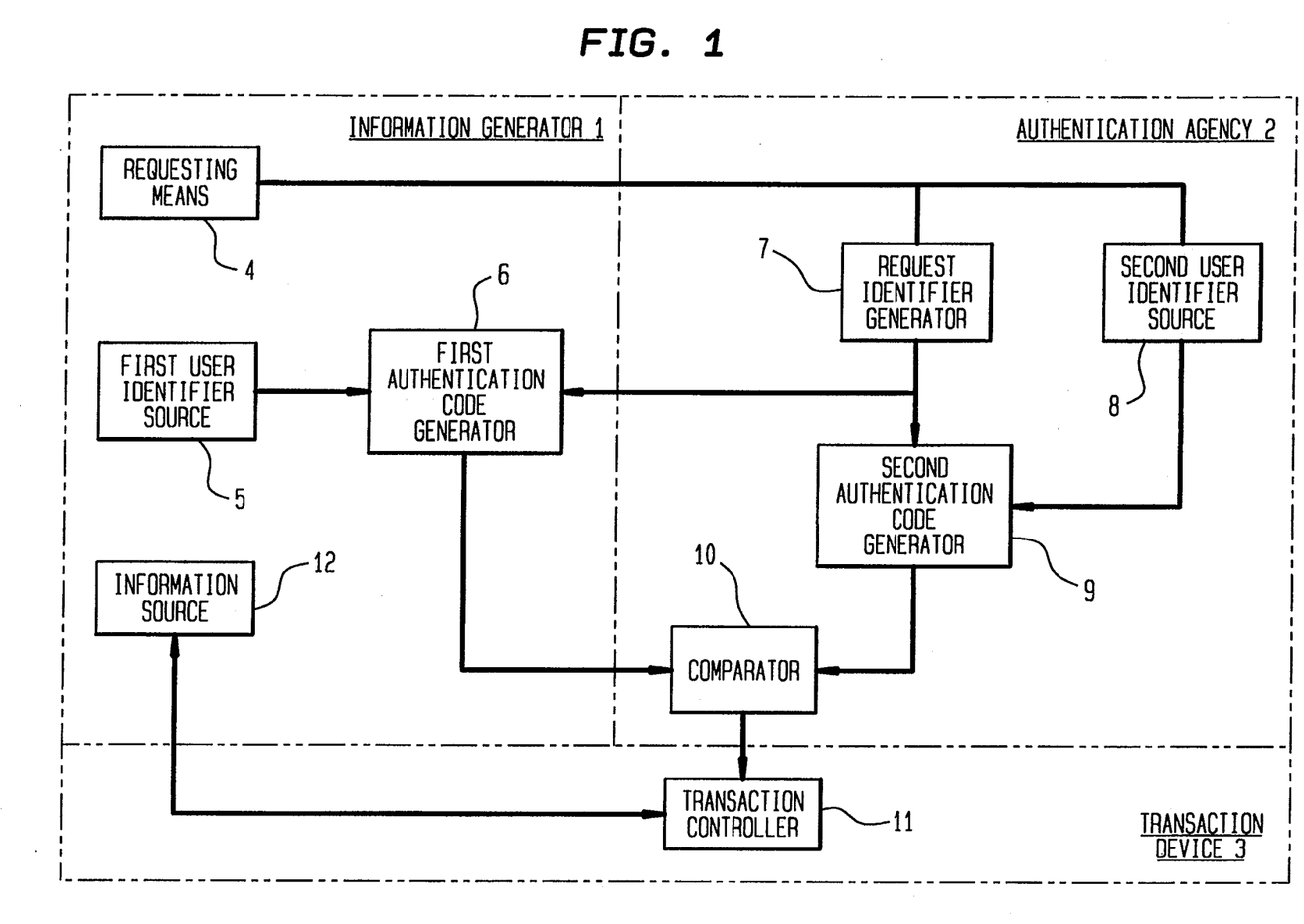
FIG. 1 depicts a transaction authentication system of the invention.

FIG. 1 shows an exemplary device of the invention including an information generator 1 an authentication agency 2, and a transaction device 3. Within the information generator 1, a requesting means 4 transmits a transaction request to the authentication agency 2 together with information identifying the information generator. A first user identifier source 5 transmits the user identifier such as the user's PIN, to the first authentication code generator 6. The request is received by the request identifier generator 7 and the information identifying the information generator 1 is received by the second user identifier source 8. The request identifier generator 7 produces a request identifier unique to that particular transaction request and passes it to the first authentication code generator 6 and the second authentication code generator 9. The second user identifier source 8 obtains the user's PIN and passes it to the second authentication code generator 9. The first authentication code generator 6 and the second authentication code generator 9 produce first and second authentication codes and pass them to a comparator 10 for comparison.

A successful comparison of the two authentication codes will result in generation of a permit signal which is then passed to the transaction controller 11. The transaction controller 11 will then permit the information from the information source 12 to complete the transaction that is being attempted whether it be the electrical access to another system or physical access to a security area. For transactions involving independent information generation, the requesting means 16 and first authentication code generator 19 would form the nucleus of a transaction access module.

Figure 2:
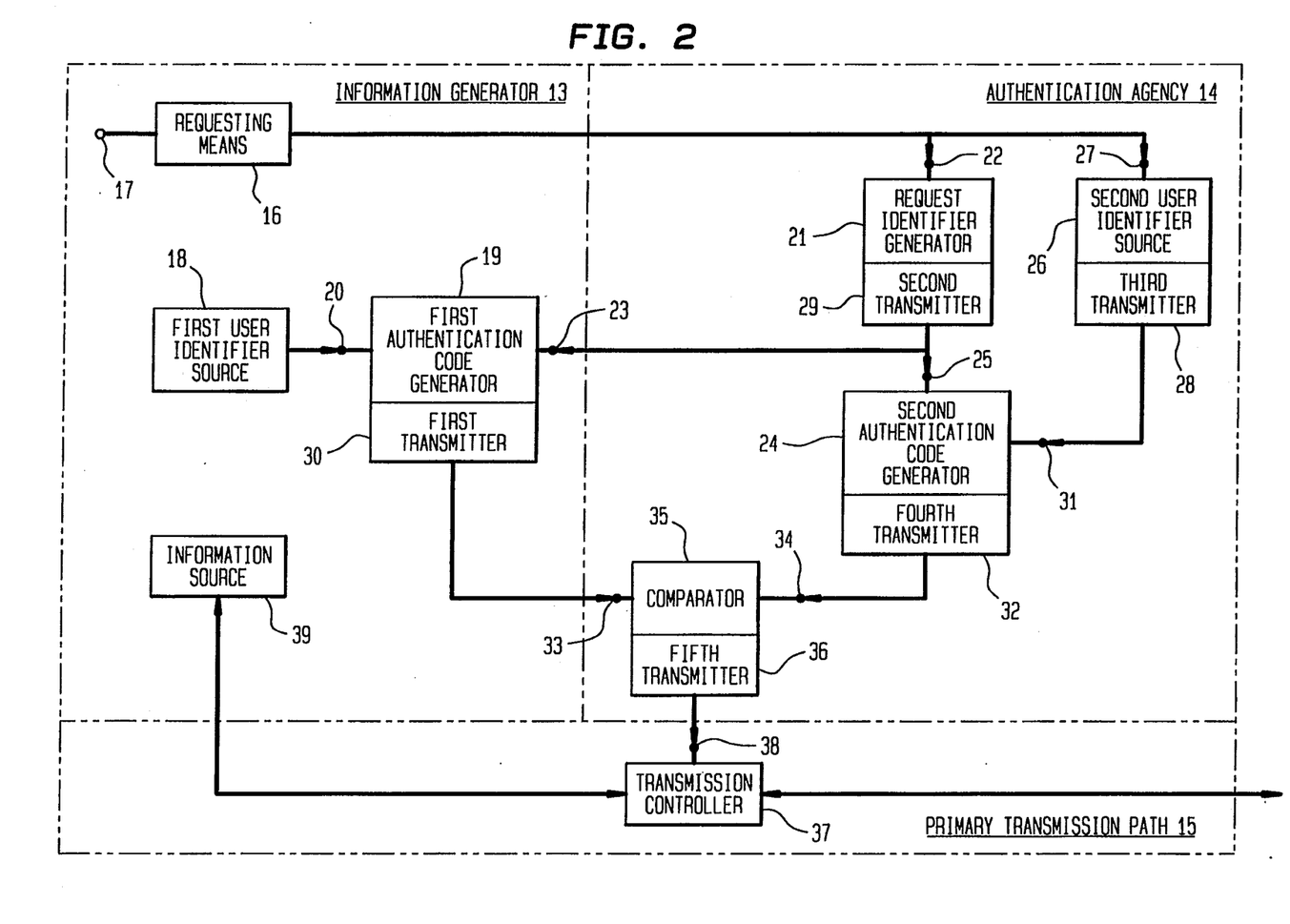
FIG. 2 depicts a transaction authentication system of the invention in which the transaction is the transmission of information through a primary transmission path.

FIG. 2 shows an exemplary device of the invention in which the transaction involved is the transmission of information from an information generator 13 through a primary transmission path 15 to a communication terminal outside of the system. The transmission through the primary transmission path 15 is controlled by an authentication agency 14. The information generator includes a requesting means 16 which may have a key port 17. The requesting mean presents the transmission request to the authentication agency 14. The information generator 13 also includes a first user identifier source 18 which transmits the first user identifier to a first authentication code generator 19 through a first user identifier access port 20. In the authentication agency 14 the transmission request is presented to a request identifier generator 21 which generates a request identifier unique to that particular request. In a telecommunication system, the request identifier could be the time and date of the request, information which is readily available within a central office, or it could be a random number or pseudo random number generated by any one of the random number generators known in the art. The request identifier is transmitted by a second transmitter 29 to the first authentication code generator 19 through the first request identifier access port 23 and to a second authentication code generator 24 through a second request identifier access port 25.

In the authentication agency 14 the transmission request, which also contains information identifying the information generator 13, is transmitted to a second user identifier source 26 through a second transmission request access port 27. The second user identifier source 26 accesses its database to determine the user identifier corresponding to the information generator 13 and transmits it through a third transmitter 28 to the second authentication code generator 24 through the second user identifier access port 31.

The first authentication code generator 19 includes a first transformer for transforming the first user identifier and the first request identifier to produce a first authentication code. The transformation produced by the transformer is advantageously an irreversible transform. However, some applications with lesser privacy requirements may use a reversible transform. The second authentication code generator 24 includes a second transformer for transforming the second request identifier together with the second user identifier to produce a second authentication code. The first authentication code is transmitted by means of a first transmitter 30 to a comparator 35 through a first authentication code access port 33. The second authentication code is transmitted by means of a fourth transmitter 32 to the comparator 35 through a second authentication code access port 34. The comparator includes a comparing means for comparing the first and second authentication codes. If the comparison is successful a permit signal is generated in the comparator 35 and transmitted by means of fifth transmitter 36 to a transmission controller 37 through a permit signal access port 38. The transmission controller 37 then permits the transmission of information from the information source 39 within the information generator 13 through the primary transmission path 15.

The first authentication code generator 19 may contain the first encryption means for encrypting the first user identifier. In this case the second user identifier source 26 must either store the user identifiers in encrypted form or must contain a second encryption means for encrypting the second user identifier when it is accessed. If the user identifiers are employed in encrypted form, then successive application of the first encryption means and the first transform must produce a total transformation which is identical to successive application of the second encryption means and the second transformer. This can be accomplished either by making the two encryptions identical and the two transformations identical or by making the encryptions and transformations different from one another such that the successive application of the two is identical in the two branches of the system.

Depending upon an analysis of the vulnerabilities of the particular system, the comparator 35 may include transformers at the first authentication code access port 33 and the second authentication code access port 34. These transformers may produce identical transformations or transformations that ultimately produce identical total transformations, as explained above.

Figure 3:
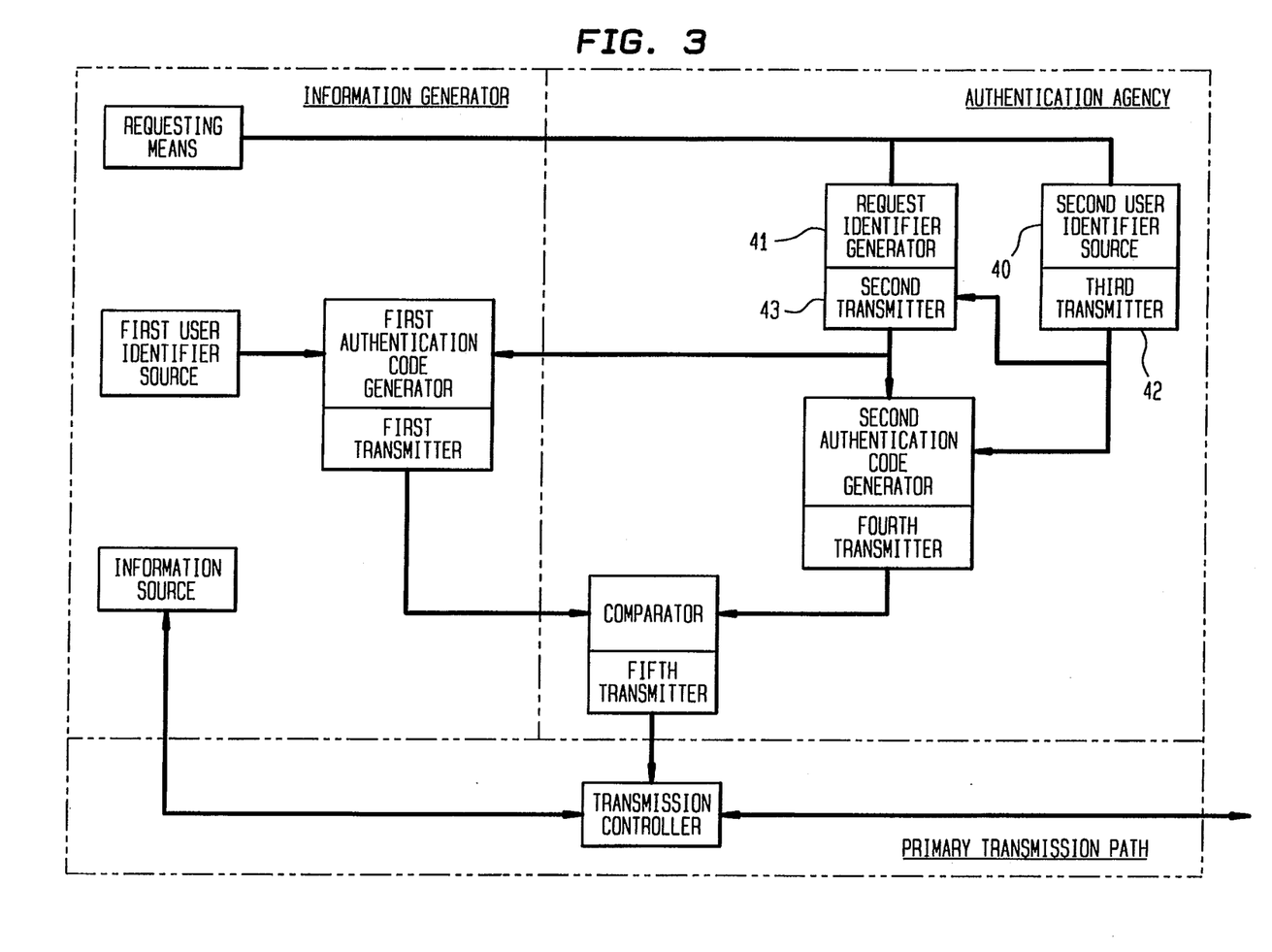
FIG. 3 depicts a system as depicted in FIG. 1 in which the second transmitter transforms the request identifier together with the second user identifier.

FIG. 3 shows a device of the invention in which the vulnerability analysis has indicated the advisability of transmitting the request identifier as a transform. In this case the third transmitter 42 is also adapted for transmitting the second user identifier to the second transmitter 43 and the second transmitter 43 includes a third transformer for transforming the request identifier together with the second user identifier.

Figure 4:
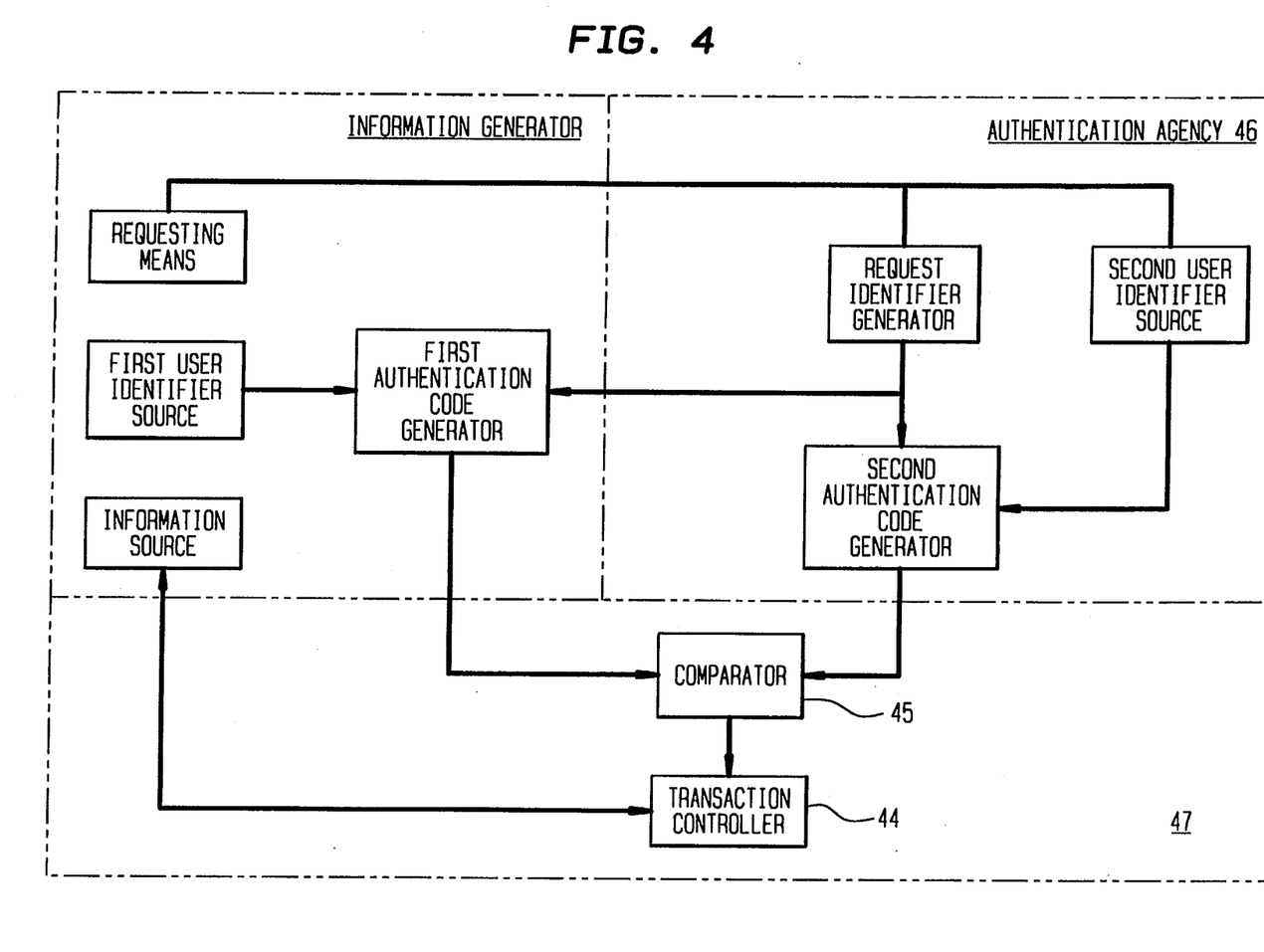
FIG. 4 depicts a system as depicted in FIG. 1 in which the comparator is associated with the transmission controller.

FIG. 4 shows an exemplary device of the invention in which the comparator 45 is associated with the transaction device 47. This would be the case for example, if a commercial entity went into the business of being an authentication agency and offered authentication services to different entities that controlled the transaction controller 44.

Figure 5:
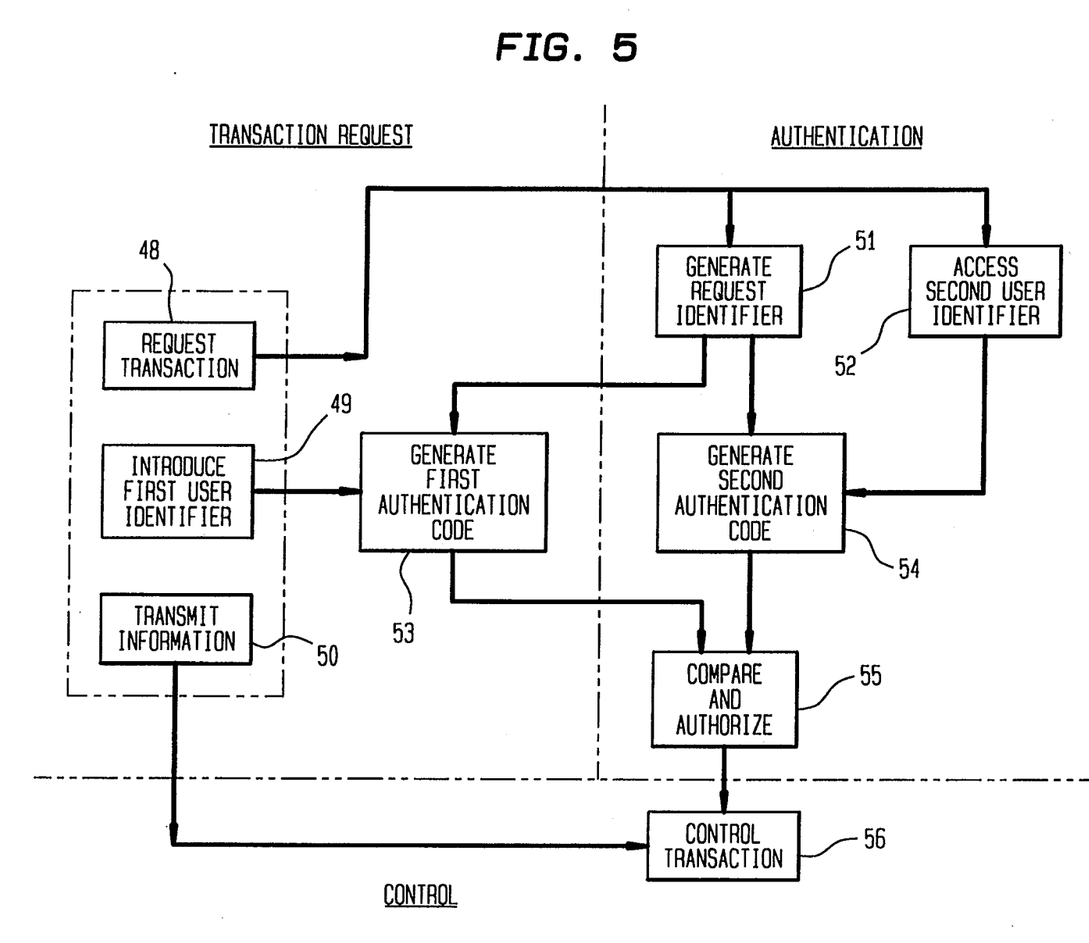
FIG. 5 depicts a transaction authentication method of the invention.

FIG. 5 illustrates the steps in the inventive process. Either simultaneously or in the following sequence; a transaction is requested 48, a first user identifier is introduced 49, and information is transmitted 50. The transaction request results in generation of a request identifier 51 and database access of a second user identifier 52.

The request identifier and the first user identifier are used to generate the first authentication code 53 and the second user identifier and request identifier generate a second authentication code 54. The first authentication code and second authentication code are compared and if the comparison is successful the transaction is authorized 55. The authorization produces control of the transaction 56.

Figure 6:
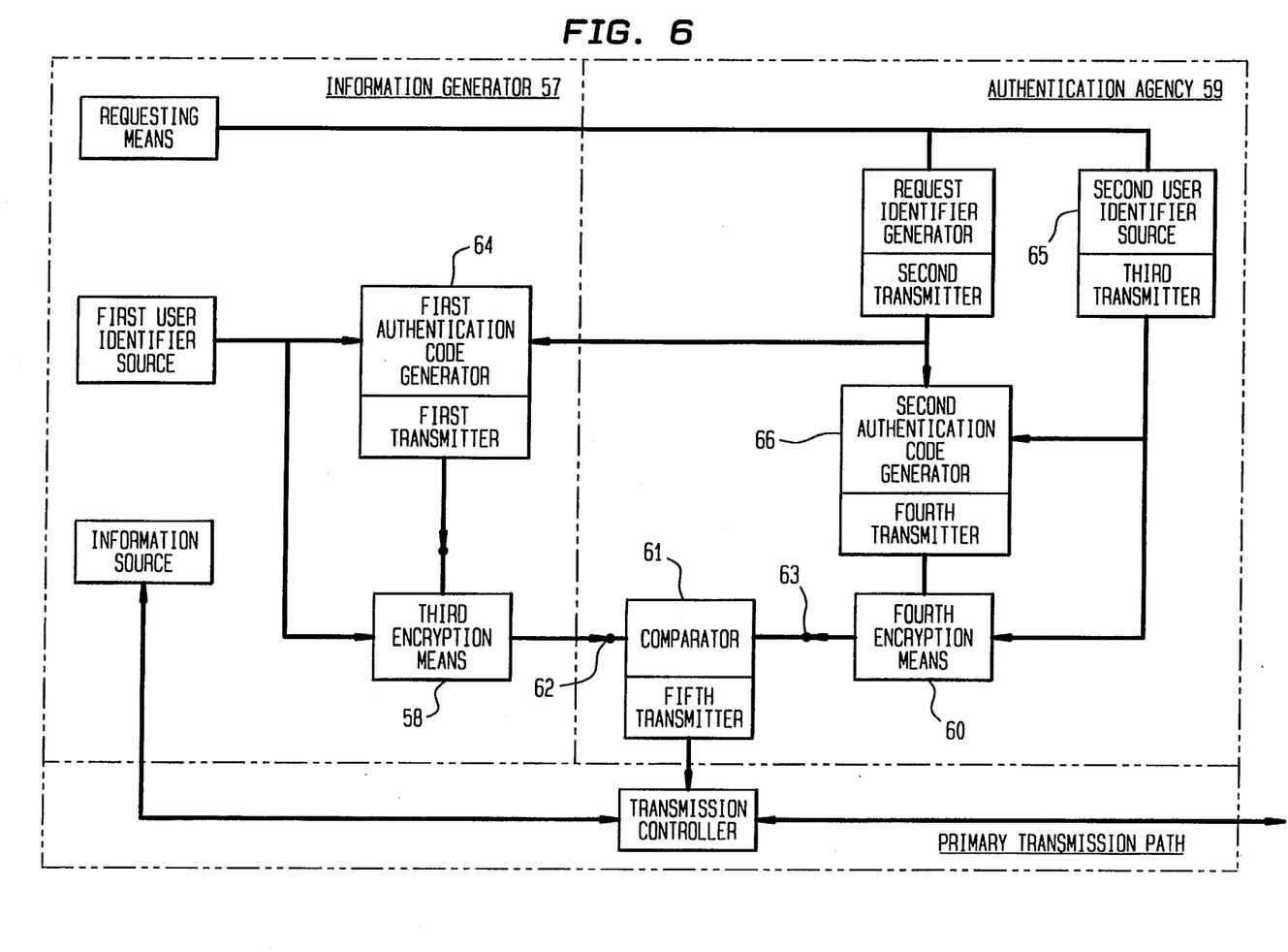
FIG. 6 depicts a system as depicted in FIG. 2 including means to encrypt the authentication codes.

FIG. 6 illustrates another level of security in which the information generator 57 includes a third transformation/encryption means 58 for combining the first authentication code and the first user identifier. In addition, the authentication agency 59 includes a fourth transformation/encryption means 60 for combining the second authentication code and the second user identifier. The comparator 61 includes a fifth encryption means at the first authentication code access port 62 and a sixth encryption means at the second authentication code access port 63. Successive application of the first encryption means and the first transformer within the first authentication code generator 64, the third encryption means 58 and the fifth encryption means at the first authentication code access port 62 produces an identical transformation to the successive application of the second encryption means within the second user identifier source 65, the second transformer within the second authentication code generator 66, the fourth encryption means 60 and the sixth encryption means within the comparator at the second authentication code access port 63.

What is claimed:

1. In an information transmission system comprising an authentication agency, a primary transmission path, a switch in the primary transmission path, and an information generator with a station identifier, an authentication method comprising the steps of:

introducing a first user identifier from a first user identifier source into a first authentication code generator within the information generator;

transmitting a transmission request from the information generator to the authentication agency;

transmitting the station identifier from the information generator to the authentication agency; accessing a record in a second user identifier source of the user identifier corresponding to the station identifier in response to the transmission request;

forwarding the second user identifier from the second user identifier source to a second authentication code generator within the authentication agency;

generating a request identifier in a request identifier generator, in response to the transmission request;

transmitting the request identifier from the request identifier generator to the first and second authentication code generators;

generating a first authentication code in the first authentication code generator and a second authentication code in the second authentication code generator in response to the request identifier and the first and second user identifiers;

transmitting the first and second authentication codes to a comparator;

comparing the first and second authentication codes and generating a permit signal only if the comparison is successful, showing that the first user identifier and the request identifier have experienced the same total transformation as the second user identifier and the request identifier; and transmitting the permit signal to the switch, enabling information flow through the primary transmission path, whereby information flow through the primary transmission path is permitted only after successful comparison of the first and second authentication codes.

2. A method of claim 1 in which the first authentication code and the second authentication code are generated through use of identical irreversible transforms.

3. A method of claim 2 including a step of encrypting the user identifier.

4. A method of claim 1 in which the first authentication code and the second authentication code are generated through use of encryption transforms.

5. A method of claim 1 in which the request identifier includes the time and date of the transmission request.

6. A method of claim 1 in which the request identifier is a number that is not repeated within the time span of the transmission request.

7. A method of claim i in which the first authentication code and the second authentication code are generated through use of identical transforms.

8. A method of claim i in which the first authentication code is generated through use of a first transform, comparison of the first authentication code includes use of a second transform, the second authentication code is generated through use of a third transform, and comparison of the second authentication code includes use of a fourth transform, the transforms being such that successive application of the first and second transform is identical to the successive application of the third and fourth transform.

9. A method of claim 8 in which the first transform and the third transform are irreversible transforms.

10. A method of claim i in which the information generator communicates with the authentication agency by means of radio transmission.

11. A method of claim i in which introducing the user identifier into the first authentication code generator includes the step of introducing an enabling key into the information generator.

12. A method of a claim 1 in which transmitting the request identifier includes transforming the request identifier together with the second user identifier.

13. An authenticating information transmission system comprising an information generator, an authentication agency and a primary transmission path, the information generator communicating with the authentication agency, said agency controlling the primary transmission path, wherein the information generator comprises:

requesting means for presenting a transmission request to the authentication agency;

a first authentication code generator comprising a first user identifier access port, a first request identifier access port, a first transformer for combining a first user identifier and a first request identifier transmitted to the respective access port to produce a first authentication code, and a first transmitter for transmitting the first authentication code to the authentication agency; and an information source for introducing information into the primary transmission path, wherein the authentication agency comprises:

a request identifier generator comprising a first transmission request access port and a second transmitter for transmitting the request identifier to the first authentication code generator and to a second authentication code generator;

a user identifier source comprising a second transmission request access port and a third transmitter for transmitting a second user identifier to the second authentication code generator;

the second authentication code generator comprising a second request identifier access port, a second user identifier access port, a second transformer for combining the second request identifier and the second user identifier, transmitted to the respective access port to produce a second authentication code, and a fourth transmitter for transmitting the second authentication code to a comparator; and the comparator comprising a first authentication code access port, a second authentication code access port, a comparing means for comparing the first authentication code and the second authentication code, transmitted to the respective access port, and producing a permit signal only if the first authentication code and the second authentication code, when compared by the comparing means, are equal, indicating a matching condition between the first and second authentication codes, and a fifth transmitter for transmitting the permit signal to the primary transmission path; and wherein the primary transmission path comprises a transmission controller with a permit signal access port for authorizing transmission when the permit signal is transmitted to the permit signal access port.

14. A device of claim 13 in which the requesting means includes a key port for accepting an enabling key with the first user identifier.

15. A device of claim 14 in which the first authentication code generator includes first encryption means for encrypting the first user identifier.

16. A device of claim 15 in which the user identifier source includes a second encryption means for encrypting the user identifier.

17. A device of claim 16 in which successive application of the first encryption means and the first transformer produces an identical transformation to successive application of the second encryption means and the second transformer.

18. A device of claim 16 in which the information generator further includes a third transformation/encryption means for combining the first authentication code and the first user identifier, the authentication agency further includes a fourth transformation/encryption means for combining the second authentication code and the second user identifier, the comparator includes a fifth encryption means at the first authentication code access port and a sixth encryption means at the second authentication code access port, wherein successive application of the first encryption means, the first transformer, the third transformation/encryption means and the fifth encryption means produces an identical transformation to the successive application of the second encryption means, the second transformer, the fourth transformation/encryption means and the sixth encryption means.

19. A device of claim 13 in which the first transformer and the second transformer produce the same irreversible transform.

20. A device of claim 13 in which the first transformer and the second transformer produce reversible encryption transforms.

21. A device of claim 13 in which the request identifier generator transmits a request identifier including the time and date of the transmission request.

22. A device of claim 13 in which the request identifier generator transmits a request identifier that is not repeated within the time span of the transmission request.

23. A device of claim 13 in which the third transmitter is also adapted for transmitting the second user identifier to the second transmitter and the second transmitter includes a third transformer for transforming the request identifier together with the second user identifier.

24. A transaction request authentication process comprising the steps of:
   introducing a first user identifier into a first authentication code generator, within a user device;
   transmitting a transaction request to an authentication agency;
   in the authentication agency, generating a request identifier and a second user identifier in response to the transaction request;
   transmitting the request identifier to the first authentication code generator and to a second authentication code generator, within the authentication agency;
   transmitting the second user identifier to the second authentication code generator;
   generating a first authentication code in response to the first user identifier and the request identifier and a second authentication code in response to the second user identifier and the request identifier;
   transmitting the first authentication code and the second authentication code to a comparator, within the authentication agency;
   generating a permit signal in the comparator in response to the first and second authentication codes; and
   transmitting the permit signal to a transaction device, thereby authorizing a transaction to proceed.

25. A method of claim 24 including the step of encrypting the first user identifier and the second user identifier.

26. A method of claim 24 in which the first authentication code and the second authentication code are generated using an irreversible transform.

27. A method of claim 24 in which the request identifier includes the time and date of the transaction request.

28. A method of claim 24 in which the request identifier is a number that is not repeated within the time span of the transmission request.

29. A method of claim 24 in which the first and second authentication codes are generated using an encryption transform.

30. A method of claim 24 including the steps of encrypting the first and second authentication codes.

31. A method of claim 24 including transforming the request identifier together with the second user identifier.

32. A transaction request authentication process comprising the steps of:
   introducing a first user identifier into a first authentication code generator, within a user device;
   generating a request identifier in the user device;
   transmitting a transaction request and the request identifier to an authentication agency;
   in the authentication agency, generating a second user identifier in response to the transaction request;
   transmitting the request identifier to the first authentication code generator and to a second authentication code generator, within the authentication agency;
   transmitting the second user identifier to the second authentication code generator;
   generating a first authentication code in response to the first user identifier and the request identifier and a second authentication code in response to the second user identifier and the request identifier;
   transmitting the first authentication code and the second authentication code to a comparator, within the authentication agency;
   generating a permit signal in the comparator in response to the first and second authentication codes; and
   transmitting the permit signal to a transaction device, thereby authorizing a transaction to proceed.

33. A transaction request authentication process comprising the steps of:
   in an authentication agency, generating a request identifier and a user identifier in response to a transaction request from a user;
   transmitting the request identifier to the user and to an authentication code generator;
   transmitting the user identifier to the authentication code generator;
   generating a first authentication code in the authentication code generator in response to the request identifier and the user identifier;
   transmitting the first authentication code to a comparator; receiving into the comparator a second authentication code produced by the user in response to the request identifier;
   generating a permit signal in the comparator in response to the first authentication code and the second authentication code; and transmitting the permit signal to a transaction device, thereby authorizing a transaction to proceed.

34. An information generator for use in an authenticating information transmission system comprising:
   requesting means for presenting a transmission request to an authentication agency;
   a first authentication code generator comprising a first user identifier access port, a first request identifier access port, a first transformer for combining a first user identifier and a first request identifier transmitted to the respective access port to produce a first authentication code, and a first transmitter for transmitting the first authentication code to the authentication agency; and
   an information source for introducing information into the primary transmission path.

35. A device of claim 34 in which the first transformer is adapted for producing an irreversible transform.

36. An authentication agency for use in an authenticating transaction system comprising:
   A request identifier generator comprising a first transaction request access port and a second transmitter for transmitting the request identifier to the first authentication code generator and to a second authentication code generator;
   a user identifier source comprising a second transaction request access port, a third transaction request access port and a third transmitter for transmitting the second user identifier to the second authentication code generator;

the second authentication code generator comprising a second request identifier access port, a second user identifier access port, a second transformer for combining the second request identifier and the second user identifier, transmitted to the respective access port to produce a second authentication code, and a fourth transmitter for transmitting the second authentication code to a comparator; and the comparator comprising a first authentication code access port, a second authentication code access port, a comparing means for comparing the first authentication code and the second authentication code, transmitted to the respective access port, and producing a permit signal in response to the first and second authentication codes, and a fifth transmitter for transmitting the permit signal to the primary transaction path for authorizing the transaction to proceed.

37. A transaction access module for use in a authenticating transaction system comprising: requesting means for presenting a transaction request to an authentication agency; and a first authentication code generator comprising a first user identifier access port, a first request identifier access port, a first transformer for combining a first user identifier and a first request identifier to produce a first authentication code, and a first transmitter for transmitting the first authentication code to the authentication agency.

* * * * *

UNITED STATES PATENT AND TRADEMARK OFFICE
CERTIFICATE OF CORRECTION

PATENT NO. : 5,343,529
DATED : August 30, 1994
INVENTOR(S) : Milton Goldfine, Marvin Perlman, Robert A. Montgomery It is certified that error appears in the above-indentified patent and that said Letters Patent is hereby corrected as shown below:

Col. 6, Line 37: After "requesting" delete "mean" and insert --means--.

Col. 9, Claim 7: After "claim" delete "i" and insert --1--.

Claim 8: After "claim" delete "i" and insert --1--.

Claim 10: After "claim" delete "i" and insert --1--.

Claim 11: After "claim" delete "i" and insert --1--.

Signed and Sealed this

Seventh Day of March, 1995

Attest:

BRUCE LEHMAN

*Attesting Officer*      *Commissioner of Patents and Trademarks*